(12) United States Patent
Rosenstrater et al.

(10) Patent No.: US 12,011,990 B2
(45) Date of Patent: Jun. 18, 2024

(54) PLASTIC TANK FOR MOTOR VEHICLES HAVING AT LEAST ONE REINFORCING STRUCTURE

(71) Applicant: KAUTEX TEXTRON GmbH & Co. KG, Bonn (DE)

(72) Inventors: Sebastian Rosenstrater, Cologne (DE); Frank Quant, Bonn (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 169 days.

(21) Appl. No.: 17/761,911

(22) PCT Filed: Aug. 21, 2020

(86) PCT No.: PCT/EP2020/073519
§ 371 (c)(1),
(2) Date: Mar. 18, 2022

(87) PCT Pub. No.: WO2021/052714
PCT Pub. Date: Mar. 25, 2021

(65) Prior Publication Data
US 2022/0371433 A1    Nov. 24, 2022

(30) Foreign Application Priority Data
Sep. 20, 2019   (DE) .......................... 102019125403.5

(51) Int. Cl.
*B60K 15/03* (2006.01)
(52) U.S. Cl.
CPC ........ *B60K 15/03177* (2013.01); *B60K 15/03* (2013.01); *B60K 2015/0344* (2013.01)

(58) Field of Classification Search
CPC .. B65D 11/22; B65D 11/20; B60K 15/03177; B60K 15/03006; B60K 15/03;
(Continued)

(56) References Cited

U.S. PATENT DOCUMENTS 2,376,351 A * 5/1945 Gay ....................... B23K 5/006
220/586
2,376,831 A * 5/1945 Stearns ..................... F17C 1/06
29/422

(Continued)

FOREIGN PATENT DOCUMENTS

CH         521267        4/1972
CN         110217098     9/2019
(Continued)

OTHER PUBLICATIONS

Translation of EP906843A1. Wouters et al., Sep. 21, 1998, Paragraph 19 (Year: 1998).*

(Continued)

*Primary Examiner* — Robert J Hicks
(74) *Attorney, Agent, or Firm* — Lee & Hayes, P.C.

(57) ABSTRACT

A plastic container for a motor vehicle having a container wall delimiting a container interior, and having at least one stiffening structure which is connected to the container wall in a planar manner. A border of the stiffening structure has at least two mutually identical edge profiles between two points located on the border. Further, the border, at least in sections along its longitudinal extension, in the region of each of the edge profiles, is at a distance from a direct connecting line connecting the two points.

16 Claims, 3 Drawing Sheets

Figure 1A:
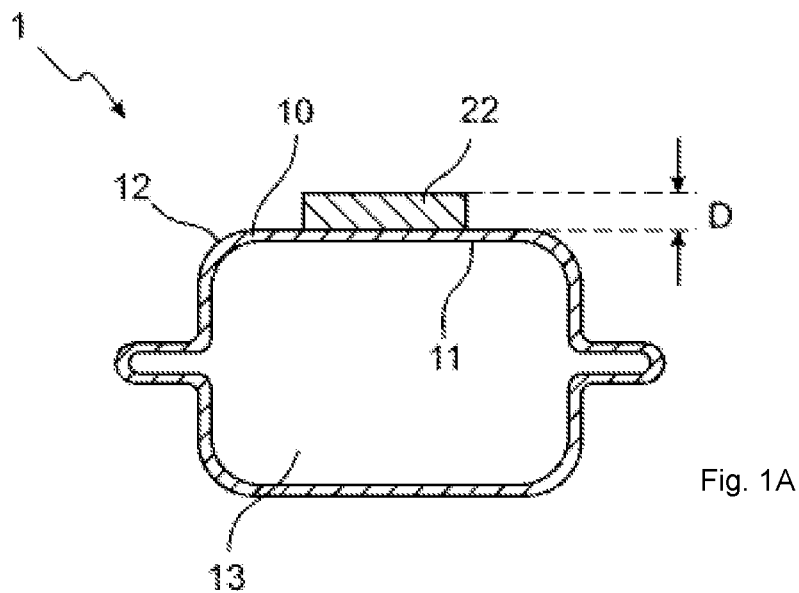

(58) Field of Classification Search
CPC ..... B60K 2015/0344; Y10T 137/86212; F17C 2203/011; F17C 2260/011
USPC ........ 220/563, 562, 592, 675, 651, 646, 639
See application file for complete search history.

(56) References Cited

U.S. PATENT DOCUMENTS

| | | | | |
|---|---|---|---|---|
| 2,629,354 | A | * | 2/1953 | Gay .................. B21D 51/24 220/586 |
| 3,528,582 | A | * | 9/1970 | Rigollot ............ G21C 13/087 220/651 |
| 3,598,275 | A | * | 8/1971 | Francois ............... B63B 3/13 428/113 |
| 3,764,277 | A | * | 10/1973 | Hollis ................ F41H 5/0492 428/656 |
| 6,715,626 | B2 | | 4/2004 | Malik et al. |
| 2002/0053568 | A1 | | 5/2002 | Balzer et al. |
| 2002/0100759 | A1 | | 8/2002 | Schmidt et al. |
| 2010/0237080 | A1 | | 9/2010 | Gebert et al. |
| 2011/0068109 | A1 | | 3/2011 | Boecker et al. |
| 2016/0167506 | A1 | | 6/2016 | Gebert et al. |
| 2019/0300195 | A1 | * | 10/2019 | Bolukbasi et al. .... B64D 37/32 |
| 2019/0331297 | A1 | * | 10/2019 | Delanoe et al. ........ F17C 3/027 |

FOREIGN PATENT DOCUMENTS

| | | | | |
|---|---|---|---|---|
| DE | 20110548 | | 2/2002 | |
| DE | 102010044584 | | 3/2012 | |
| DE | 102011115384 | | 1/2013 | |
| DE | 202013101658 | U1 * | 6/2013 | ....... B60K 15/03177 |
| DE | 102013012687 | | 2/2015 | |
| DE | 102016201477 | | 8/2017 | |
| DE | 102016209544 | | 12/2017 | |
| DE | 102016217135 | | 3/2018 | |
| DE | 102017006085 | | 1/2019 | |
| EP | 906843 | A1 * | 4/1999 | ....... B60K 15/03177 |
| EP | 0955241 | | 11/1999 | |
| EP | 2319719 | | 5/2011 | |
| GB | 555912 | A * | 9/1943 | ................ F17C 1/04 |
| JP | H0891436 | | 4/1996 | |
| JP | 2002106787 | | 4/2002 | |
| JP | 2006321309 | | 11/2006 | |
| WO | WO202013101658 | U1 * | 7/2017 | ....... B60K 15/03177 |
| WO | WO2018131295 | | 11/2019 | |

OTHER PUBLICATIONS

Translation of DE102011115384A1, Kopiec, Nov. 11, 2013, Paragraph 44 (Year: 2013).*
PCT Search Report for corresponding PCT Application No. PCT/EP2020/073519 dated Dec. 8, 2020, 16 pages.
PCT International Preliminary Report on Patentability (English translation) for corresponding PCT Application No. PCT/EP2020/073519 dated Dec. 14, 2021, 8 pages.

* cited by examiner

PLASTIC TANK FOR MOTOR VEHICLES HAVING AT LEAST ONE REINFORCING STRUCTURE

This Application claims priority to PCT Application No. PCT/EP2020/073519, filed Aug. 21, 2020, which claims priority to DE Patent Application No. 102019125403.5, filed Sep. 20, 2021, the contents of each of which is incorporated herein by reference.

The present invention relates to a plastic container for motor vehicles, having a stiffening structure.

The following refers to plastic containers designed as fuel containers. Plastic containers according to the invention are in particular, but not exclusively, fuel tanks (for gasoline or diesel fuel), urea tanks, windshield washer fluid tanks, oil tanks, auxiliary fluid tanks, or additive tanks for motor vehicles, and battery housings for traction batteries, also for motor vehicles. Containers of the type mentioned at the outset are frequently produced by extrusion blow molding, wherein HDPE (high density polyethylene) is particularly suitable for the production of extrusion blow molded containers. Furthermore, it is possible to produce corresponding operating fluid containers by means of an injection molding process. Furthermore, it is also possible to manufacture corresponding operating fluid containers by rotational sintering. Suitable materials include polyamide (PA) and/or polyoxymethylene (POM).

In motor vehicles with an internal combustion engine, when a plastic container, in particular the fuel tank, is subjected to heat, the operating fluid, for example, the fuel, is also heated, such that the vapor pressure of the operating fluid increases and the plastic container is subjected to a corresponding internal pressure, as a result of which the plastic container is subject to deformation.

In order to vent a plastic container in the form of a fuel tank, the latter is fluidly connected to a fuel vapor filter to filter off fuel vapors. The fuel vapor filter can be designed as an activated carbon filter, for example. During operation of the internal combustion engine, the activated charcoal filter is flushed by means of intake air, such that fuel vapors bound in the activated charcoal can be fed to the internal combustion engine.

In hybrid motor vehicles, a further problem is the reduced operating time of the internal combustion engine. Due to the reduced operating time of the internal combustion engine, an activated charcoal filter that is fluidly connected to the fuel tank is accordingly flushed less, such that less fuel vapor bound in the activated charcoal can be flushed out. This can result in activated carbon filters having to be sized larger in hybrid motor vehicles. Furthermore, by venting the fuel tank via the activated charcoal filter, due to the pressure drop inside the fuel tank, more fuel is converted into the vapor phase, such that it would be advantageous to design the fuel tank to be stiffer and/or more pressure-resistant. This is because the fuel tank can then be fluidly separated from the activated charcoal filter by means of a controllable valve, as a result of which the activated charcoal filter is loaded with less fuel vapor.

Efforts are therefore being made to increase the pressure resistance of plastic tanks, in particular of fuel tanks, and in particular of fuel tanks for hybrid motor vehicles. Fuel tanks for hybrid motor vehicles should preferably be able to withstand an overpressure of up to 400 mbar (millibar) or more, and an underpressure of around 150 mbar or more.

It is known from the prior art to reinforce a plastic container by means of a stiffening element arranged between two opposing container walls, wherein the stiffening element is connected to the container walls. A corresponding plastic container is known from DE 10 2013 012 687 A1. This plastic container has increased structural stability in conditions of both overpressure and underpressure. The disadvantage of this type of stiffening, however, is that the interior of the container can no longer be used in its entirety without an obstruction.

In order to solve the disadvantages resulting from DE 10 2013 012 687 A1, it is known from the prior art to connect a flat reinforcement structure to the container wall in order to increase the stability and/or the pressure resistance of the container. The disadvantage of a corresponding reinforcement of the container is that when the container is subjected to highly dynamic loading, for example when the motor vehicle in which the container is installed is involved in an accident, crack formation occurs at the edge of the stiffening structure, and crack propagation occurs in the plastic container.

The present invention is based on the object of providing a plastic container which withstands highly dynamic loads in an improved manner, and which can also withstand increased overpressure and underpressure, and which demonstrates reduced deformation under pressure, wherein, at the same time, it should be ensured that the interior of the container remains usable with no, or with fewer, restrictions.

The object of the present invention is solved by an operating fluid container having the features of claim 1. Advantageous embodiments of the operating fluid container are described in the claims dependent on claim 1.

In more detail, the object on which the present invention is based is achieved by a plastic container for a motor vehicle, having a container wall delimiting the interior of the container, and having at least one stiffening structure which is connected in a planar manner to the container wall, wherein the plastic container is characterized in that a border of the stiffening structure has, between at least two points located on the border, at least two mutually identical edge profiles in each case, and in that the border, at least in sections along its longitudinal extension, in the region of each of the edge profiles, is at a distance from a direct connecting line connecting the at least two points.

The correspondingly designed plastic container has the advantage that, in the event of a highly dynamic load (for example in the event of an accident to the motor vehicle in which the plastic container is installed), the plastic container exhibits less crack formation and crack propagation in the edge region of the stiffening structure. The correspondingly designed plastic container therefore has improved stability. Furthermore, the plastic container according to the invention can better withstand overpressure and underpressure with respect to the atmosphere within the interior of the container, while ensuring that the interior of the container can continue to be used without obstruction.

The container wall is made of a plastics material. The container wall is preferably constructed in several layers. More preferably, the container wall comprises high-density polyethylene (HDPE). More preferably, the container wall has an inner layer which is preferably made of high-density polyethylene (HDPE), an adhesion-promoting layer which is preferably made of low-density polyethylene (LDPE), and an outer layer which is preferably made of high-density polyethylene (HDPE). More preferably, the container wall comprises polyamide and/or POM.

For applications in which the plastic container is designed as a fuel tank, in particular as a fuel tank for gasoline, the plastic container according to the invention has excellent barrier properties for hydrocarbons, since the stiffening structure and/or the stiffening structures do not compromise a barrier layer (for example an EVOH layer) of the container wall, and do not restrict the functionality thereof.

The plastic container is preferably formed from a thermoplastic material. For applications in which the plastic tank is designed as a fuel tank, the container wall(s) can be made of a material layer system comprising an inner layer in the form of an HDPE layer, an adhesion promoting layer in the form of an LDPE layer, a barrier layer in the form of an EVOH layer, a further adhesion promoting layer in the form of an LDPE layer, and an outer layer in the form of a further HDPE layer or a recycled material layer.

The first stiffening structure, and/or the stiffening structures, are preferably connected to the container wall over the entire surface thereof. This connection is preferably made in a materially bonded manner, for example by means of a weld. It is also possible for the stiffening structure to be glued to the container wall.

Furthermore, it is also possible for the stiffening structure or stiffening structures to be connected to the container wall, preferably over part of the surface thereof.

Preferably, the stiffening structure is fiber reinforced.

The fiber reinforcement of the stiffening structure or the stiffening structures takes place by means of reinforcing fibers, which can also be referred to as fiber material. The fiber material preferably has glass fibers and/or carbon fibers and/or polymer fibers and/or aramid fibers and/or natural fibers (e.g., flax fibers) and/or another suitable fiber material.

The stiffening structure or the stiffening structures preferably have a thermoplastic or a duroplastic matrix or matrix material in which the fiber material is embedded.

The fiber-reinforced stiffening structures can absorb tensile forces, and can thus be referred to as tensile strength increasing stiffening structures or reinforcing devices. Preferably, the stiffening structures can also absorb compressive forces, and can thus be referred to as tensile strength-increasing and/or compression strength-increasing stiffening structures or reinforcing devices.

The stiffening structure preferably has a greater length and width dimension than thickness dimension. Preferably, the area spanned by the length and width of the stiffening structure rests on the container wall.

The two identical edge profiles preferably merge directly into each other, that is, a second edge profile directly joins with a first edge profile.

An edge profile can also be referred to as a repetition unit and/or as a border profile.

The distance from the border to the direct connecting line is non-zero. The connecting line connecting the two points is a theoretical, and therefore imaginary, connecting line. In a plan view of the stiffening structure, the edge profiles are at a distance from the connecting line that is non-zero, at least in sections.

The stiffening structure is further preferably designed in such a way that the entire border of the stiffening structure has a plurality of edge profiles arranged in a sequence one next to the other. For example, the entire border of the stiffening structure has an undulating profile. More preferably, the entire border of the stiffening structure has no straight edge regions.

The feature according to which the border of the stiffening structure has at least two mutually identical edge profiles between at least two points on the border can also be expressed in such a way that the border has at least two identical edge profiles between two first points and has at least two further identical edge profiles between two second points, and so on. That is to say that, between two n-th points, it has at least two further identical edge profiles, where n is a natural number greater than two.

The fuel tank is preferably designed in such a way that each of the edge profiles has an extension running parallel to the connecting line that is greater than a wall thickness of the stiffening structure.

The extension of the edge profile running parallel to the connecting line is the projection of the longitudinal extension of the edge profile onto the connecting line.

A corresponding design of the plastic container further reduces the formation and propagation of cracks in the container wall in the event of a highly dynamic load.

The fuel tank is preferably designed in such a way that each of the edge profiles has an extension running parallel to the connecting line that is less than half an edge length of the stiffening structure.

A corresponding design of the plastic container particularly effectively counteracts crack propagation in the container wall in the event of highly dynamic loading of the plastic container, such as occurs, for example, in the event of a motor vehicle accident.

The fuel tank is preferably designed in such a way that the edge profiles run cyclically between the two points. A corresponding design of the plastic container even further reduces the formation and propagation of cracks in the container wall in the event of a highly dynamic load.

Because the edge profiles are cyclic between the two points, the edge profiles are undulating between the two points. Consequently, the border of the stiffening structure has an undulating profile between the two points.

The fuel tank is preferably designed in such a way that the border has edge profiles that are continuously differentiable.

A corresponding design of the plastic container even further reduces the formation and propagation of cracks in the container wall in the event of a highly dynamic load. This is because, due to the continuous differentiability of the edge profiles, the edge profiles have no edges, as a result of which crack propagation in the container wall is particularly effectively counteracted when the plastic container is subjected to highly dynamic loading.

A function or an edge profile is referred to as being continuously differentiable if the function or the edge profile is differentiable and the derivation obtained in this way is continuous.

The fuel tank is preferably designed in such a way that the border has edge profiles that are discontinuously differentiable.

Due to the corresponding shaping of the stiffening structure, it can be better adapted to different predetermined geometries of the plastic container.

More preferably, the edge profiles are rounded in the area in which their mathematical derivation is non-continuous.

The fuel tank is preferably designed in such a way that the border has sinusoidal edge profiles.

The border preferably runs between the two points through at least 720°—that is, two full sine periods.

The fuel tank is preferably designed in such a way that the border has semicircular edge profiles, with a convex edge profile adjoining a concave edge profile.

The border preferably runs between the two points through at least 720°, such that the border between the two points has at least two convex and two concave semicircles.

The fuel tank is preferably designed in such a way that the border has edge profiles that each correspond to a spline/polynomial curve.

The fuel tank is preferably designed in such a way that the border has trapezoidal edge profiles.

The corners of each of the trapezoids are preferably rounded.

The fuel tank is preferably designed in such a way that the border has sawtooth-shaped edge profiles.

The flanks of each of the edge profiles preferably form an angle of less than 90°.

The corners of each of the saw teeth are preferably rounded.

The fuel tank is preferably designed in such a way that the border has rectangular edge profiles.

The corners of each of the rectangles are preferably rounded.

The fuel tank is preferably designed in such a way that the stiffening structure is connected to an inner surface of the container wall that faces the tank interior, and/or to an outer surface of the container wall that faces away from the tank interior.

The fuel tank is preferably designed in such a way that a first stiffening structure is connected to an inner surface of the container wall facing the tank interior, and a second stiffening structure is connected to an outer surface of the container wall facing away from the tank interior.

The fuel tank is preferably designed in such a way that the container wall is arranged at least in sections in a sandwich-like manner between the first stiffening structure and the second stiffening structure, in such a manner that the first stiffening structure and the second stiffening structure are arranged overlapping at least in sections.

The designed plastic container designed in this way has many advantages. Due to the sandwich-like arrangement of the container wall between the first and second stiffening structures, the container wall has increased flexural strength in both bending directions, such that the plastic container exhibits reduced deformation both when subjected to overpressure and to underpressure in the container interior (relative to atmospheric pressure). The plastic container according to the invention can thus withstand both greater overpressures and greater underpressures.

Due to the increased rigidity of the correspondingly designed plastic container, it exhibits significantly reduced deformations when subjected to an overpressure load and/or an underpressure load. This makes it possible for the plastic container to be installed in a motor vehicle at a reduced distance from body components and/or from other motor vehicle parts. As a result, the space available for installing the plastic container in a motor vehicle can be used in an improved manner, such that the plastic container according to the invention has an increased capacity for a given installation space in a motor vehicle.

A further advantage of the correspondingly designed plastic container is the property that when the plastic container cools down after it has been manufactured (by a blow molding process or by an injection molding process or by a rotational sintering process), its container wall exhibits reduced distortion, since the container wall is provided with a stiffening structure not only on one side—that is, on the outer surface or the inner surface thereof—but is provided with a stiffening structure both on the outer surface and on the inner surface.

The feature according to which the container wall is arranged at least in sections in a sandwich-like manner between the first stiffening structure and the second stiffening structure in such a way that the first stiffening structure and the second stiffening structure are arranged overlapping at least in sections is equivalent to the feature that a surface normal of the container wall in a region of overlap with the first stiffening structure and/or with the second stiffening structure passes through the first stiffening structure and the second stiffening structure. This means that, in a plan view of the container wall—that is, in a viewing direction parallel to the surface normal of the container wall—the first stiffening structure and the second stiffening structure overlap. That is to say, the surface normal of the container wall in the region of the container wall that is connected to the first stiffening structure and to the second stiffening structure passes through both the first stiffening structure and the second stiffening structure.

In the event of a deformation of the container wall caused by internal overpressure, the second stiffening structure absorbs tensile forces and the first stiffening structure absorbs compressive forces. In the event of a deformation of the container wall caused by internal underpressure, the first stiffening structure absorbs tensile forces and the second stiffening structure absorbs compressive forces.

The fuel tank is preferably designed in such a way that the first stiffening structure and the second stiffening structure have the same border profiles, and in such a way that the container wall is sandwiched between the first stiffening structure and the second stiffening structure in such a manner that, in a plan view of the container wall, the first stiffening structure and the second stiffening structure are aligned with each other.

A correspondingly designed plastic container has an even higher rigidity, such that it can withstand increased overpressures and underpressures, and exhibits fewer deformations when subjected to overpressure and underpressure. These advantages are achieved despite the low weight of the plastic container.

If the container wall is arranged within a plane that is defined by an x-axis and a y-axis perpendicular thereto, then the feature according to which the first stiffening structure and the second stiffening structure are aligned with each other in a plan view of the container wall is synonymous with the feature that the first stiffening structure has the same extension in the x-direction and in the y-direction as the second stiffening structure.

Consequently, the boundary edges of the first stiffening structure and the second stiffening structure are aligned with each other.

Figure 1B:
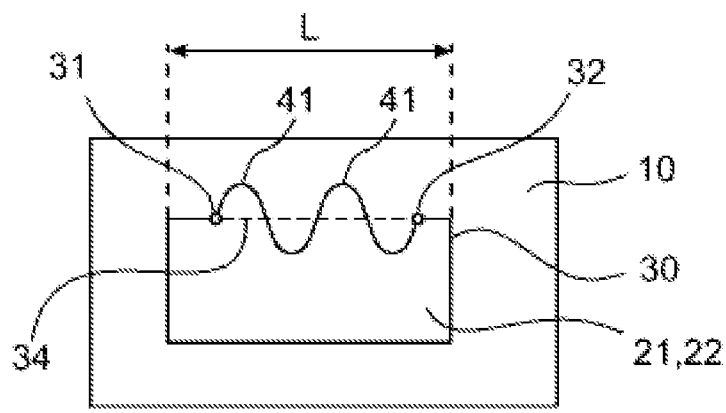
Figure 1C:
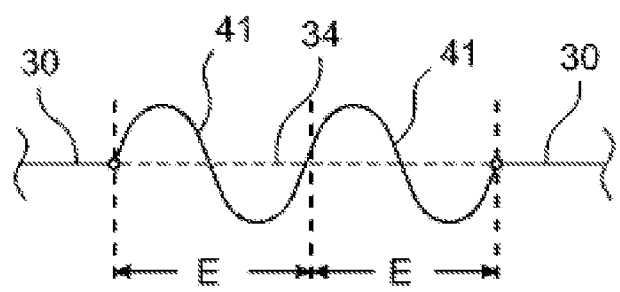
Figure 2A:
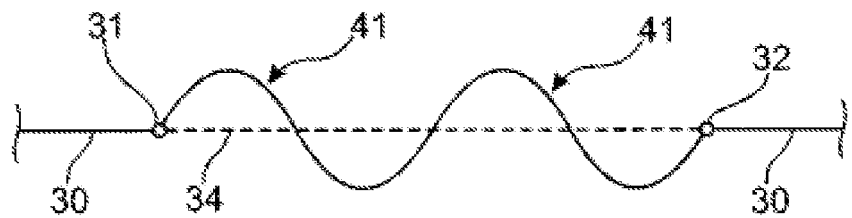
Figure 2B:
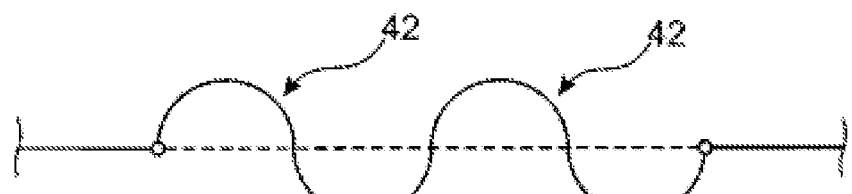
Figure 2C:
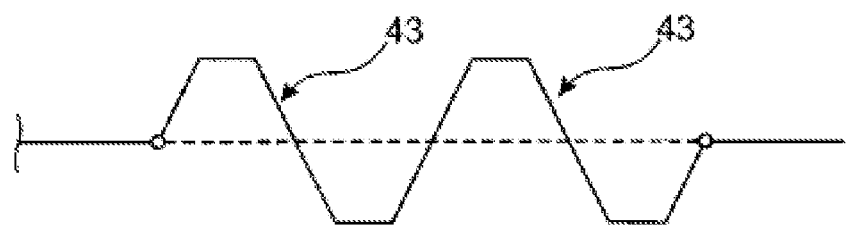
Figure 2D:
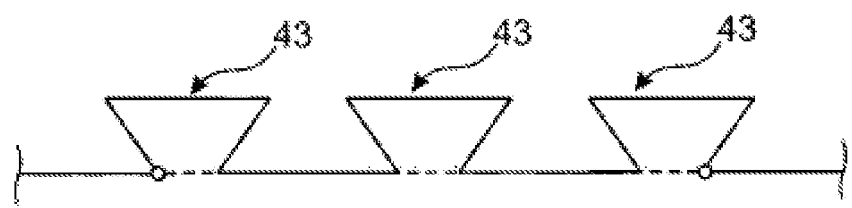
Figure 2E:
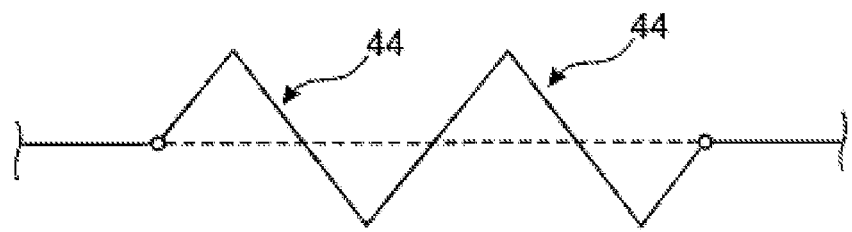
Figure 2F:
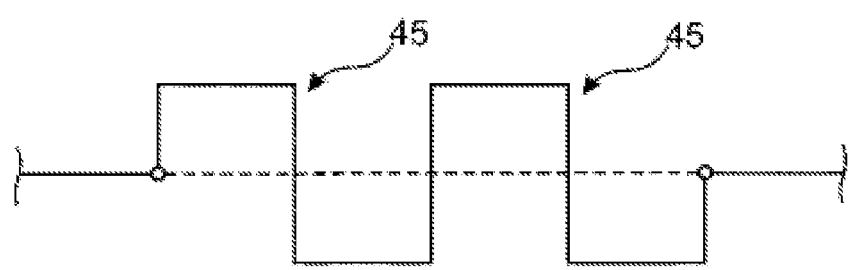
Figure 3A:
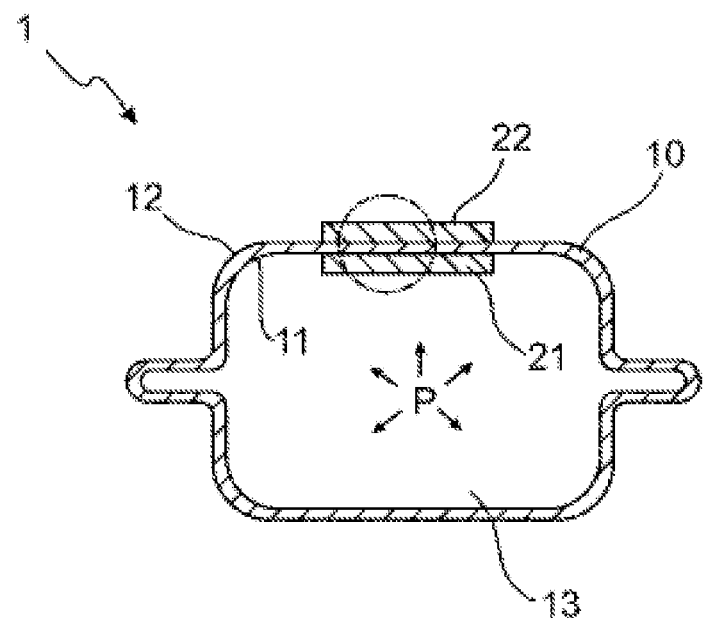
Figure 3B:
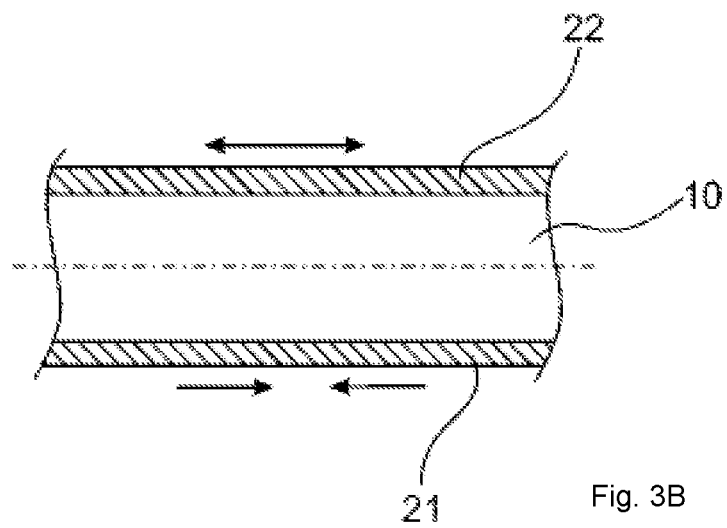

Further advantages, details, and features of the invention can be found in the following in the described embodiments. The drawings show, in detail, the following:

FIG. 1A: a schematic cross-sectional view of a plastic container according to the invention;

FIG. 1B: a plan view of the plastic container shown in FIG. 1A;

FIG. 1C: a detailed view of a stiffening structure of the plastic container shown in FIG. 1B;

FIG. 2A: a detailed view of a portion of a border of a stiffening structure of a plastic container according to a first embodiment of the present invention;

FIG. 2B: a detailed view of a portion of a border of a stiffening structure of a plastic container according to a second embodiment of the present invention;

FIG. 2C: a detailed view of a portion of a border of a stiffening structure of a plastic container according to a third embodiment of the present invention;

FIG. 2D: a detailed view of a portion of a border of a stiffening structure of a plastic container according to a fourth embodiment of the present invention;

FIG. 2E: a detailed view of a portion of a border of a stiffening structure of a plastic container according to a fifth embodiment of the present invention;

FIG. 2F: a detailed view of a portion of a border of a stiffening structure of a plastic container according to a sixth embodiment of the present invention;

FIG. 3A: a schematic cross-sectional view of a plastic container according to a further embodiment of the present invention; and FIG. 3B: a detailed view of the region encircled in FIG. 3A.

In the following description, the same reference signs denote the same components or features, such that a description of a component with reference to one drawing also applies to the other drawings, thus avoiding repetitive description. Furthermore, individual features which have been described in connection with one embodiment can also be used separately in other embodiments.

FIG. 1A shows a schematic cross-sectional representation of a plastic container 1 according to the invention for a motor vehicle. The plastic container 1 has a container wall 10 which delimits an internal space 13 of the container. Furthermore, the plastic container 1 has a stiffening structure 22 which is connected to the container wall 10 in a planar manner. In the embodiment shown, the stiffening structure 22 is connected in a planar manner to an outer surface 12 of the container wall 10. The planar connection can generally be materially bonded, with welding and/or gluing being particularly suitable for this purpose. The connection can be made over the entire surface or over part of the surface.

FIG. 1B shows the plastic container shown in FIG. 1A in a plan view of the outer surface 12 to which the stiffening structure 22 is attached. It can be seen that the stiffening structure 22 is delimited by a border 30. Between two points 31, 32 located on the border 30, the border 30 has at least two edge profiles 41 that are identical to each other. In the embodiment shown, each edge profile 41 runs in the form of a sine curve. However, the present invention is not limited to a corresponding shaping of the edge profiles, as will be explained further below with reference to FIG. 2A to 2F. It can be seen from FIG. 1B that the border 30, along its longitudinal extension, is at a distance in sections from a direct connecting line 34 connecting the first point 31 to the second point 32, in the region of each of the edge profiles 41. The connecting line 34 is to be understood as an imaginary connecting line between the points 31, 32. It is essential that the border 30 does not run completely in a straight line between the points 31, 32, and is at a distance from the connecting line 34 at least in sections.

FIG. 1C shows a detailed view of the stiffening structure 22 shown in FIG. 1B in the region of the border 30, which has the at least two edge profiles 41 that are identical to each other. Each of the edge profiles 41 has an extension E running parallel to the connecting line 34. The dimensioning of the edge profiles 41, and also of the edge profiles 42, 43, 44 and 45, which will be explained later with reference to FIG. 2A to 2F, is such that the extension E is greater than the wall thickness D of the stiffening structure 22. On the other hand, the extension E of each of the edge profiles 41, and additionally also of the edge profiles 42, 43, 44 and 45, is less than half an edge length L (see FIG. 1B) of the stiffening structure 22.

It can be seen from FIGS. 1B, 1C and 2A to 2F together that each of the edge profiles 41, 42, 43, 44 and 45 run cyclically between the two points 31, 32. The border 30 thus has an undulating profile in the region of each of the edge profiles.

Different versions of the stiffening structure are shown in FIG. 2A to 2F, wherein each version has different shapes of the border 30. In FIG. 2A, the border 30 has a sinusoidal shape between the first point 31 and the second point 32, such that each of the edge profiles 41 is sinusoidal.

In FIG. 2B, the border 30 has semicircular edge profiles 42 between the first point 31 and the second point 32. It can be seen that a convex edge profile 42 adjoins a concave edge profile 42.

In FIGS. 2C and 2D, the border 30 has trapezoidal edge profiles 43 between the first point 31 and the second point 32. Each of the edge profiles 43 of the stiffening structure shown in FIG. 2C are formed in such a manner that the edge profile 43 in the region of the first point 31 and in the region of the second point 32 forms an obtuse angle of more than 90° with the border 43. In the edge profiles 43 shown in FIG. 2D, the trapezoidal edge profiles 43 are formed in such a manner that the edge profiles 43 in the region of the first point 31 and in the region of the second point 32 form an angle of less than 90° with the adjacent border 30.

In FIG. 2E, the border 30 has sawtooth-shaped edge profiles 44 between the first point 31 and the second point 32.

The angles that the respective material edges of the stiffening structure form with each other in the region of the sawtooth-shaped edge profiles 44 can be acute (<90°) and/or also obtuse (>90°).

In FIG. 2F, the border 30 has rectangular edge profiles 45 between the first point 31 and the second point 32.

In the case of the different edge profiles 43, 44 and 45 shown in FIG. 2C to 2F, the corner regions of the edge profiles 43 can also be rounded, although this is not shown in this way in the figures.

All edge profiles 41, 42, 43, 44 and 45 have in common that they can be approximated via a spline. In the case of the edge profiles shown in FIGS. 2A and 2B, these can be appropriately approximated using a polynomial curve.

In FIG. 3A, a plastic container 1 according to a further embodiment of the present invention is shown schematically in cross section. The figure shows the plastic container 1 is subjected to an internal overpressure P. The container wall 10 shown at the top in FIG. 3A is connected to a first stiffening structure 21 and a second stiffening structure 22. The contact region of the first stiffening structure 21 with the container wall 10 and of the second stiffening structure 22 with the container wall 10 is shown enlarged in FIG. 3B.

It can be seen from FIG. 3B that when internal pressure is applied, that is, when there is an overpressure inside the plastic container interior 13 compared to the ambient pressure, the second stiffening structure 22 is subjected to tensile loading (see arrowheads pointing away from each other in the region of the second stiffening structure 22), and the first stiffening structure 21 is subjected to compression (see arrows pointing towards each other in the region of the first stiffening structure 21).

If, on the other hand, the internal space 13 of the plastic container has a lower internal pressure than the ambient pressure of the plastic container 1, the second stiffening structure 22 would be loaded in compression, whereas the first stiffening structure 21 would be loaded in tension.

LIST OF REFERENCE SIGNS 1 plastic container
10 container wall (of the plastic container)
11 inner surface (of the container wall)
12 outer surface (of the container wall)
13 container interior (of the plastic container)
21 (first) stiffening structure
22 (second) stiffening structure 30 border (of the stiffening structure)
31 (first) point (on the border)
32 (second) point (on the border)
34 direct connecting line (between two points)
41 (sinusoidal) edge profile (of the border between two points)
42 (semi-circular) edge profile (of the border between two points)
43 (trapezoidal) edge profile (of the border between two points)
44 (sawtooth) edge profile (of the border between two points)
45 (rectangular) edge profile (of the border between two points)
D wall thickness (of the stiffening structure)
E extension (of the edge profile parallel to the connecting line)
L edge length (of the stiffening structure)
P internal pressure (in the plastic container)

The invention claimed is:

1. A plastic container for a motor vehicle, the plastic container comprising:
   a container wall delimiting a container interior; and
   at least one stiffening structure which is connected planarly to the container wall,
   wherein:
      a border of the stiffening structure which delimits the stiffening structure has at least two mutually identical edge profiles between at least two points located on the border, and
      the border, in a plan view of the stiffening structure, is arranged, at least in sections, at a distance along a longitudinal extension thereof in a region of each of the edge profiles, from a direct connecting line connecting the at least two points.

2. The plastic container according to claim 1, wherein each of the edge profiles has an extension running parallel to the direct connecting line that is greater than a wall thickness of the stiffening structure.

3. The plastic container according to claim 1, wherein each of the edge profiles has an extension running parallel to the direct connecting line which is less than half an edge length of the stiffening structure.

4. The plastic container according to claim 1, wherein the edge profiles run cyclically between the at least two points.

5. The plastic container according to claim 1, wherein the border has edge profiles which are continuously differentiable.

6. The plastic container according to claim 1, wherein the border has edge profiles which are discontinuously differentiable.

7. The plastic container according to claim 1, wherein the border has sinusoidal edge profiles.

8. The plastic container according to claim 1, wherein the border has semicircular edge profiles, and
   wherein a convex edge profile adjoins a concave edge profile.

9. The plastic container according to claim 1, wherein the border has edge profiles which each correspond to a spline/polynomial curve.

10. The plastic container according to claim 1, wherein the border has trapezoidal edge profiles.

11. The plastic container according to claim 1, wherein the border has sawtooth-shaped edge profiles.

12. The plastic container according to claim 1, wherein the border has rectangular edge profiles.

13. The plastic container according to claim 1, wherein the stiffening structure is connected to an inner surface of the container wall facing the container interior and/or to an outer surface of the container wall facing away from the container interior.

14. The plastic container according to claim 1, wherein the stiffening structure is a first stiffening structure that is connected to an inner surface of the container wall facing the container interior, and
   wherein a second stiffening structure is connected to an outer surface of the container wall facing away from the container interior.

15. The plastic container according to claim 14, wherein the container wall is sandwiched at least in sections between the first stiffening structure and the second stiffening structure in such a manner that the first stiffening structure and the second stiffening structure are arranged overlapping at least in sections.

16. The plastic container according to claim 15, wherein the first stiffening structure and the second stiffening structure have the same border profiles, and
   wherein the container wall is sandwiched between the first stiffening structure and the second stiffening structure such that, in a plan view of the container wall, the first stiffening structure and the second stiffening structure are aligned with each other.

* * * * *